United States Patent
Du et al.

(10) Patent No.: US 7,063,400 B2
(45) Date of Patent: Jun. 20, 2006

(54) PRINTING APPARATUS AND METHOD FOR IMPROVING QUALITY OF PRINTING IMAGE

(75) Inventors: Ben-Chuan Du, Kweishan (TW); Yung-Li Li, Kweishan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/082,207

(22) Filed: Feb. 26, 2002

(65) Prior Publication Data

US 2002/0118239 A1    Aug. 29, 2002

(51) Int. Cl.
*B41J 29/38* (2006.01)

(52) U.S. Cl. .............................. 347/9; 347/10; 347/11; 347/12

(58) Field of Classification Search ............... 347/9, 347/43, 10, 11, 12
See application file for complete search history.

(56) References Cited

U.S. PATENT DOCUMENTS

| 4,575,730 A | * | 3/1986 | Logan et al. | 347/9 |
| 5,065,256 A | * | 11/1991 | Suganuma et al. | 347/9 |
| 5,675,365 A | * | 10/1997 | Becerra et al. | 347/9 |
| 5,914,731 A | * | 6/1999 | Yano et al. | 347/9 |
| 6,102,510 A | * | 8/2000 | Kikuta et al. | 347/9 |
| 6,142,598 A | | 11/2000 | Iwasaki et al. | |
| 2002/0024558 A1 | * | 2/2002 | Fujita et al. | 347/43 |

FOREIGN PATENT DOCUMENTS

EP    0 712 235 A2    5/1996
JP    07-125311    *    5/1995

* cited by examiner

*Primary Examiner*—Hai Pham
*Assistant Examiner*—Lam Nguyen
(74) *Attorney, Agent, or Firm*—Ladas & Parry LLP (57) ABSTRACT

The present invention is related to an apparatus and a method for improving the quality of printing. The reference timings are adjusted by random values to decrease the cyclic unevenness of images associated with the conventional technique. The random values may be generated by the apparatus itself or may be received from an external device, such as a personal computer. The distance between two adjacent dots changes, and the unevenness of images is scattered to provide a higher quality of printing.

23 Claims, 14 Drawing Sheets scanning direction

PRINTING APPARATUS AND METHOD FOR IMPROVING QUALITY OF PRINTING IMAGE

BACKGROUND OF THE INVENTION

1. Field of the Invention

The present invention relates to a printing apparatus and a method for printing images, and more particularly, to a printing apparatus and a method for forming high-quality images by forming a plurality of dots on a printing medium.

2. Description of the Related Art

Various types of printing apparatus are widely used in printers, copying machines, fax machines, and other image recording devices. Printing apparatus forms images by forming a plurality of dots on the printing media. The printing media may be paper, plastic film, clothing, etc. The printing apparatuses may use different kinds of method to perform the printing, such as dot-matrix printing, thermal transfer printing, dye-sublimation printing, ink jet printing, and laser printing, . . . etc. Generally, the thermal transfer printing and the ink jet printing methods are widely applied due to their capability of producing high quality images at reasonable cost.

Figure 1:
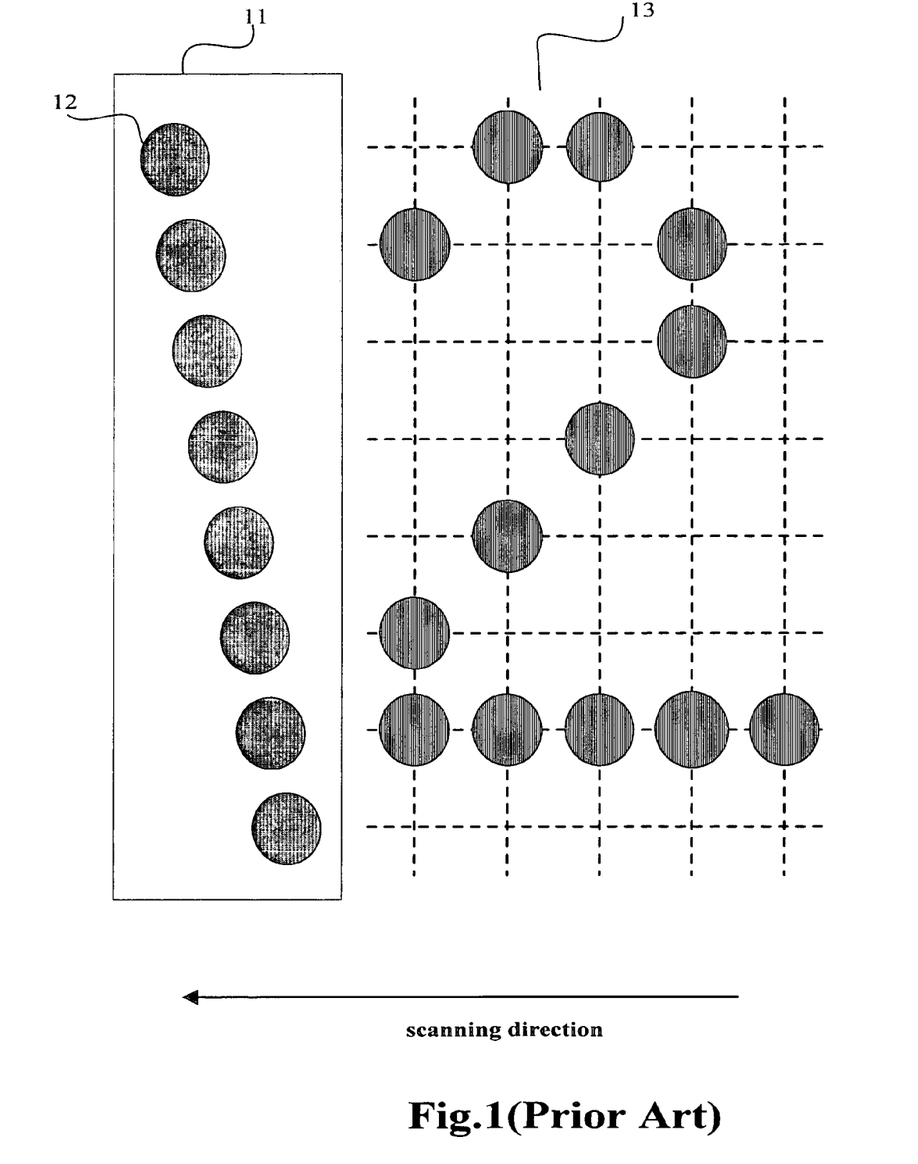
FIG. 1 depicts a print head scanning over a printing medium to form an image.

Referring to FIG. 1, a printing apparatus has a print head 11 that comprises a group of printing elements 12. When the print head 11 scans over a printing medium, the printing elements 12 form a plurality of dots on the printing medium to form an image. In this example, when the print head 11 scans in the scanning direction, an image of dot patterns 13 of Arabic numeral "2" is formed by the printing elements 12, as shown in FIG. 1.

Figure 2:
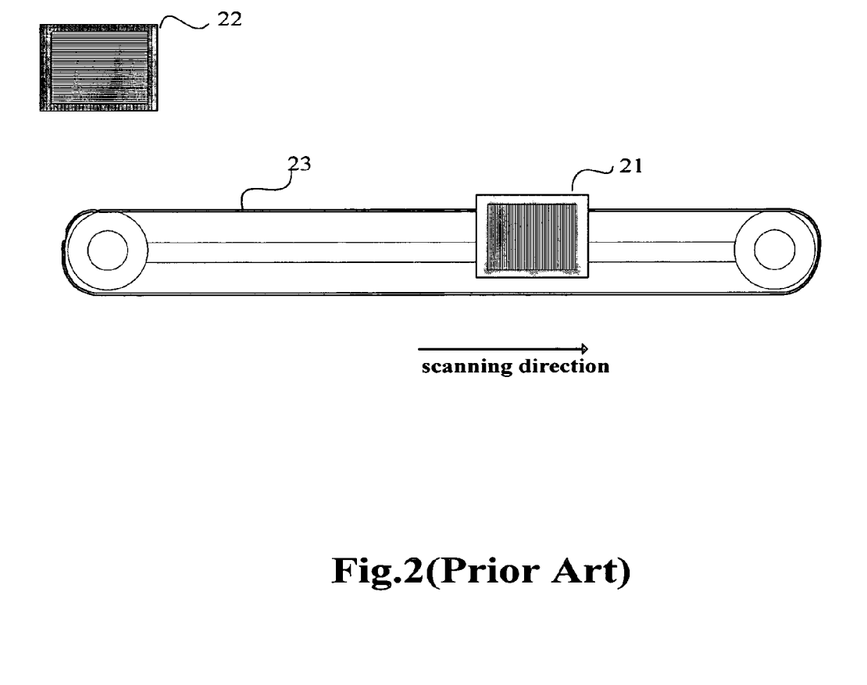
FIG. 2 depicts a print head scanning directionally controlled by a step motor.

Referring to FIG. 2, for most ink jet printing products nowadays, a step motor 22 is used to provide a power so as to drive the print head 21 to move along a scanning direction over the printing medium. As shown in FIG. 2, the step motor 22 drives the print head 21 to move in a predetermined scanning direction by using the mechanism such as belt 23. When the print head 21 scans in the predetermined scanning direction, the printing elements 12 are driven to fire ink droplets during predetermined time interval to form dots on desired positions of the printing medium.

Figure 3A:
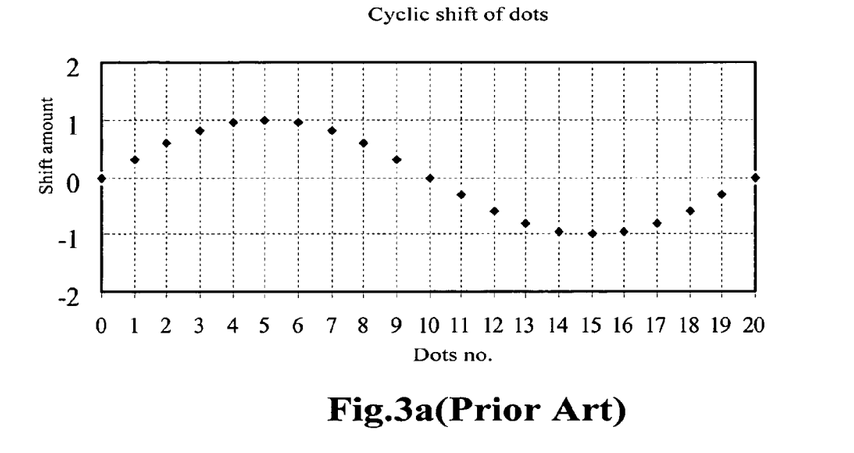
FIG. 3a shows a cyclic deviation of formed dots.
Figure 3B:
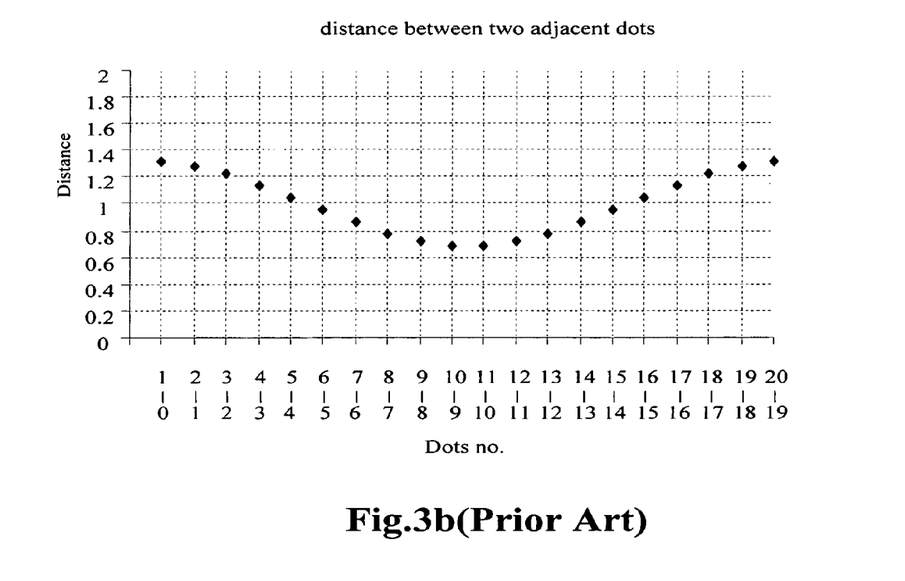
FIG. 3b shows the distance between two adjacent dots.

The purpose of the step motor is to drive the print head by a power transmission device so that the print head can scan over the printing medium at a constant speed. The power transmission device may be belt. Step motors are generally used because their cost is lower and they're comparatively easy to control. However, the variation of different components, including step motors, control chips, and belts, may cause a cyclic variation of the print head's moving speed. Therefore, the print positions of dots would cyclically deviate from the desired positions. FIG. 3a shows a cyclic unevenness phenomenon of images due to the cyclic variation of the scanning speed of the print head. The positions of dots deviate cyclically. FIG. 3b shows distance between two adjacent dots varying cyclically due to the cyclic variation. Such deviations cause noticeable unevenness of the printed image, and thus deteriorate the printing quality.

Figure 4A:
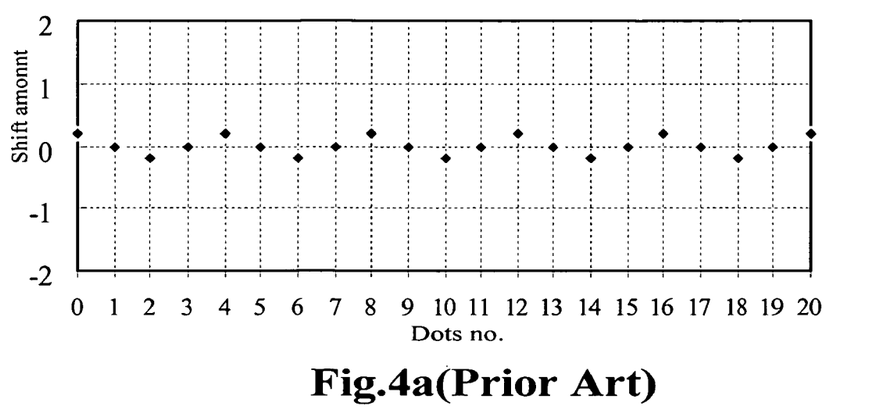
FIG. 4a shows a predetermined cyclic deviation amount.
Figure 4B:
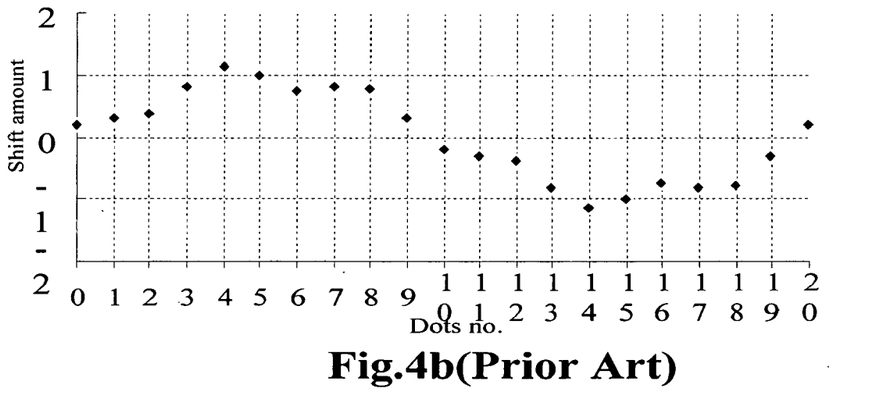
FIG. 4b depicts a shift induced by adding a predetermined cyclic deviation amount.
Figure 4C:
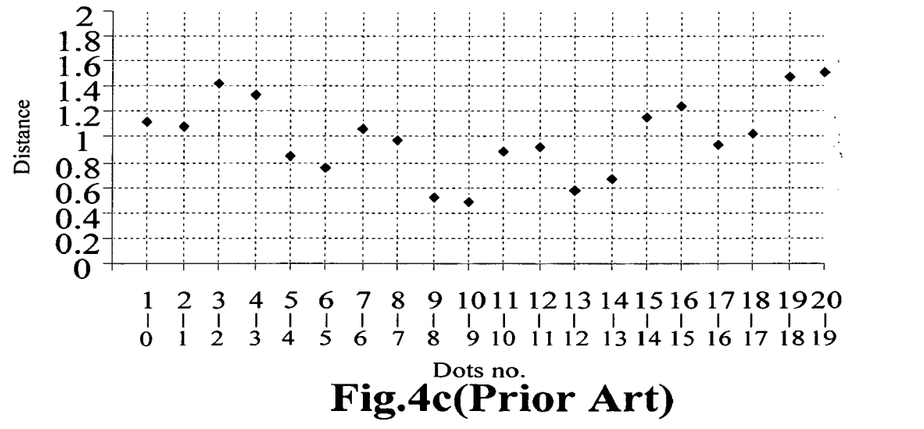
FIG. 4c shows the distance between two adjacent dots.

In the U.S. Pat. No. 6,142,598 issued to Iwasaki et al., a method is provided to decrease the cyclic unevenness of printed images by cyclically changing the time intervals between adjacent ink ejections. A predetermined cyclic deviation amount is added to the driving time interval between dots. Thus, a cyclic shift amount appears in the print position of dot. Referring to FIG. 4a, it shows shift amounts of dots when a print head moves at a constant speed across the medium. For a printing apparatus with the defect of cyclic unevenness, the Iwasaki's method shifts the deviated positions of dots. Referring to FIG. 4b, it shows the effect on cyclic deviation after Iwasaki's method is employed. FIG. 4c further shows the effect of the method on the distance between two adjacent dots. As shown is FIG. 4C, Iwasaki's method may decrease the original unevenness, however, the improvement is not satisfactory and further improvement is still desired.

SUMMARY OF THE INVENTION

The present invention provides an apparatus and a method to improve the printing quality by reducing the unevenness of printed images.

The first embodiment of the present invention discloses that the reference timing sequence is shifted by a random value sequence to generate a driving timing sequence. Then, the driving timing sequence is used to drive the printing elements. The random value sequence induces a shift of dot position to scatter the cyclic unevenness of printed image. Since the shift amount is generated randomly, a better elimination of the cyclic phenomenon is achieved.

To illustrate the features of the present invention, some preferred embodiments are recited by referring accompanying drawings.

DETAILED DESCRIPTION OF PREFERRED EMBODIMENTS

The present invention provides a printing apparatus and a method for improving quality of printed image. The apparatus and method efficiently decrease the cyclic unevenness of printed images. Embodiments of this invention are disclosed as following.

Figure 5:
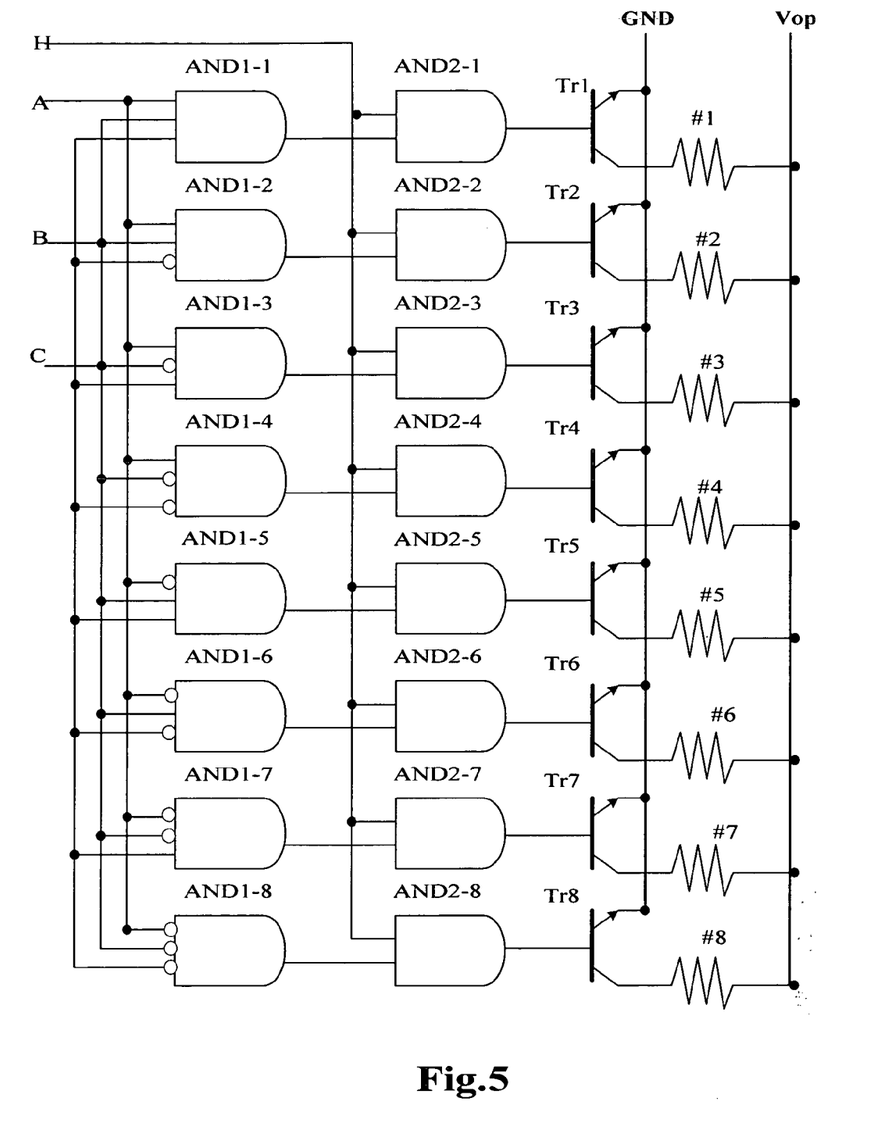
FIG. 5 shows a logical circuit for controlling the printing elements.

It is to be noted that the present invention may also be applied to the printing apparatus illustrated in FIG. 1. In the embodiment illustrated in FIG. 1, the print head 11 is an ink jet print head including eight printing elements 12. FIG. 5 shows an exemplary circuit in this embodiment to control the eight printing elements 12. Eight heaters #1 to #8, implemented inside the print head 11, is capable of generating heat so as to jet ink droplets out of the printing elements 12 and form ink dots on the printing medium. Tr1 to Tr8 are switches of the corresponding heaters. A, B, and C signals are to control the on or off of the switches Tr1 to Tr8. The A, B, C signals are derived from the reference timing sequence, i. e. clock signal. H signal represents image data.

Figure 6:
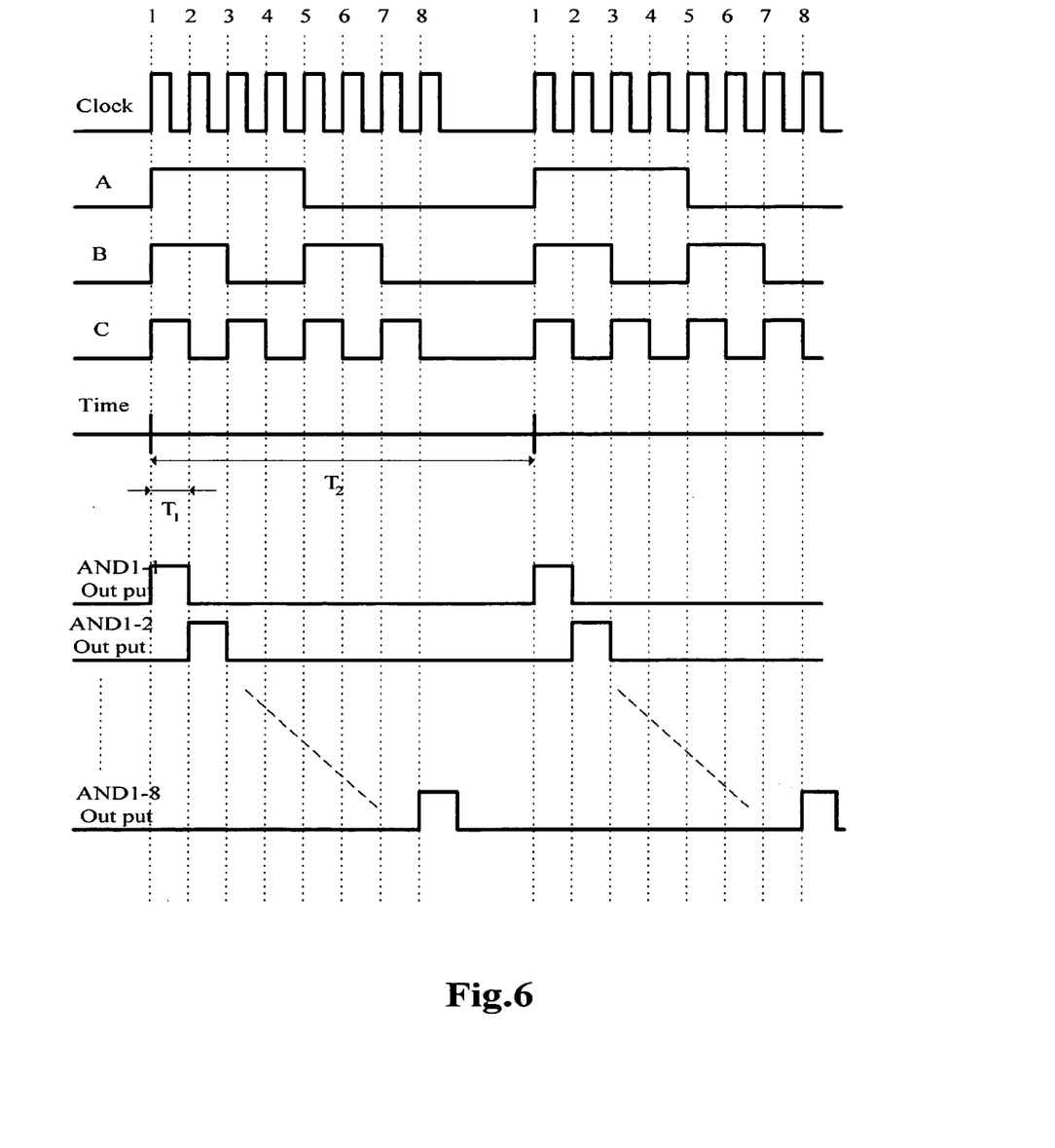
FIG. 6 is a pulse diagram of the operation of printing elements.

Please refer to FIG. 6, a pulse diagram is illustrated to describe the operation of the circuit shown in FIG. 5. The firing of the ink droplets from the printing elements 12 are separately controlled by A, B, and C signals. When H is activated, the heater of corresponding printing element 12 is switched on and ink droplets are ejected from the corresponding printing element 12 to form a dot on the printing medium.

In the present embodiment, the plurality of printing elements 12 operate in sequence, as shown in FIG. 6, to simplify the design. In other words, the printing elements 12 are not driven to eject ink droplets at the same time. Since operating in sequence, the printing elements 12 are arranged in a line slant to the moving direction of the print head, as shown in FIG. 7.

Figure 7:
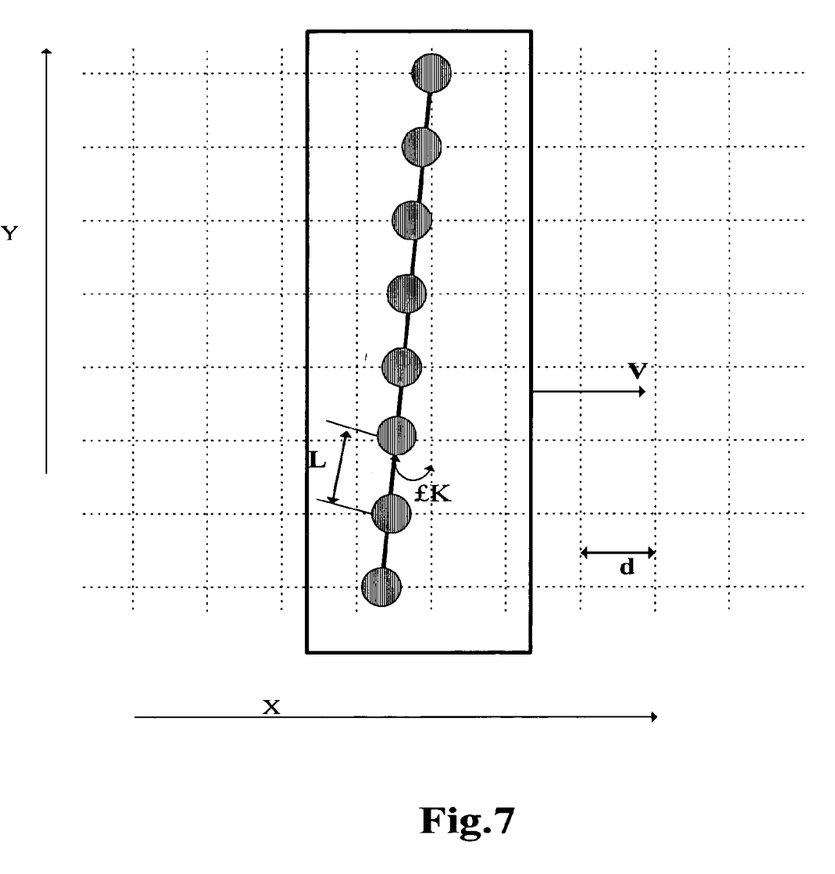
FIG. 7 depicts the movement of the print head.

FIG. 7 shows a printing head 11 with eight printing elements 12. The arrangement of the printing elements 12, the moving direction of the print head 11, and the coordinates of dots are identified in this drawing. To form the dots at predetermined positions, there are some relationships among the inclination angle θ of the printing elements 12, the distance L between the adjacent printing elements 12, the moving speed V of print head 11, and the distance d between the adjacent dots.

First, the delay time $T_1$ between two adjacent printing elements 12, as shown in FIG. 6, is $$T_1 = (L \times \sin\theta)/V.$$

$T_1$ must be set complied with the above equation so that the ink dots can be formed at predetermined positions on the printing medium. $T_1$ is used to control the formation of a group of vertical dots having identical x coordinate.

T2 is the time interval needed to form next adjacent dots along the x-coordinate. The relation among T2, V, and d is $$T_2 = d/V.$$

The present invention generates a driving timing sequence by shifting the reference timing sequence with a random value sequence. Due to the shift, the unevenness of printed image is scattered and a better quality of printed images can be obtained.

The reference timing is shifted by adding or multiplying an amount of a random value. The random value may be obtained by different approaches. For example, the random value may have a value ranges from 0 to 1. The actual driving timing is determined by adding or multiplying the random value to the reference timing.

Alternatively, the shift amount may also be determined by using a function to generate the random value. For example, if the random value has a value ($V_i$) ranges from 0 to 1, the following function may be applied to determine the shift amount ($S_i$).

Shift amount$_i(S_i)$=0, if $0<V_i<0.5$

Shift amount$_i(S_i)$=−0.2, if $0.5<V_i<0.75$

Shift amount$_i(S_i)$=0.2, if $0.75<V_i<1$ wherein i is a reference index of the random value. The implement of function simplifies the determination of random values.

Figure 8:
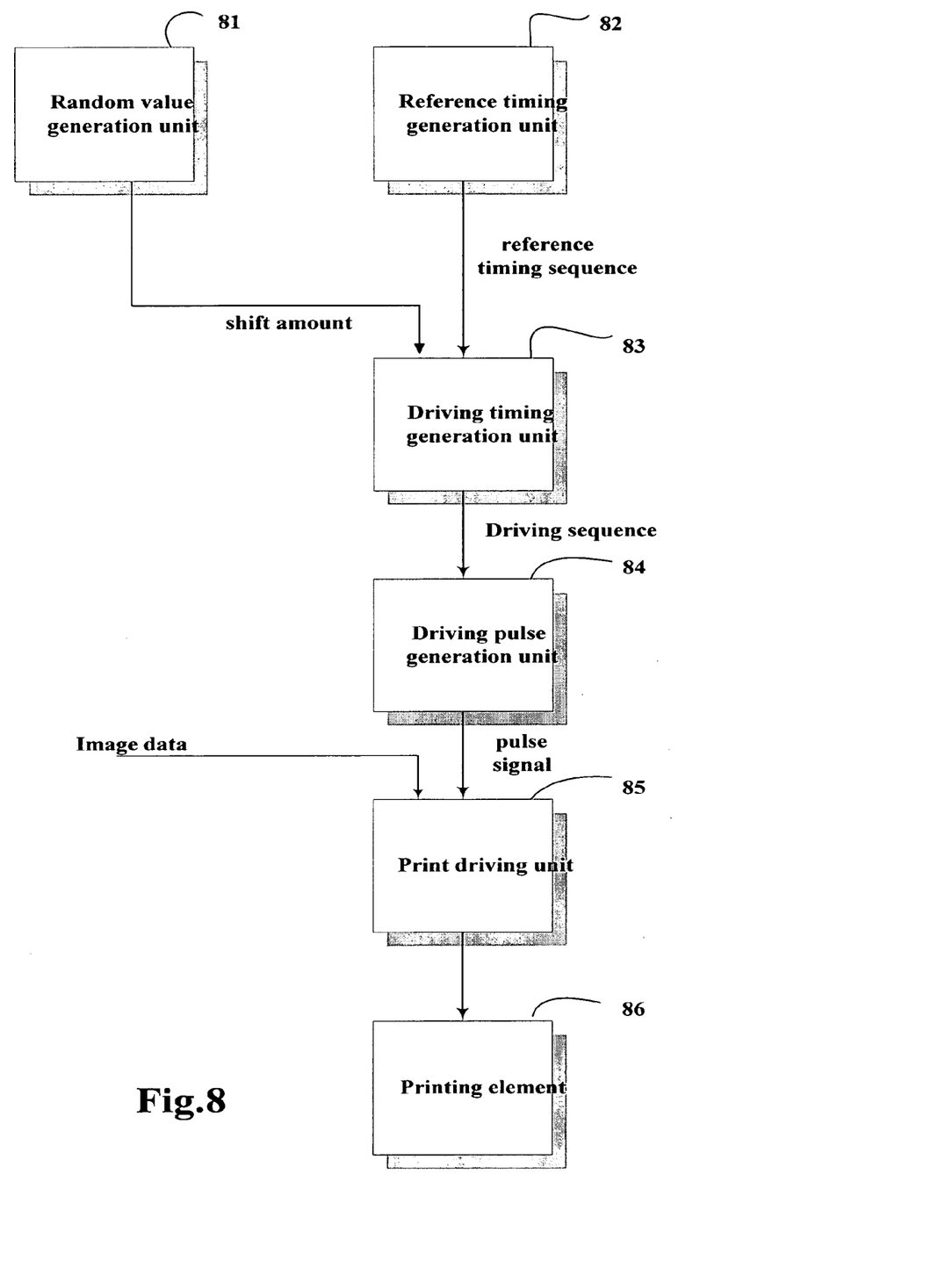
FIG. 8 is a flow diagram showing an exemplary flow of the present invention.

FIG. 8 illustrates a flow chart to explain the operation of this embodiment. A reference timing generation unit 82 generates a reference timing by conventional methods. The present invention includes a random value generation unit 81 for generating a random value sequence as described above. A driving timing generation unit 83 generates a driving timing sequence by shifting the reference timing, responsive to the reference timing and the random value. The unit 83 shifts the reference timing either by using addition or multiplication method. A driving pulse generation unit 84 generates a pulse signal to the print driving unit 85, responsive to the driving timing sequence. The print driving unit 85, receiving the pulse signal and the image data, drives a printing element 86 to form image at desired positions.

Figure 9A:
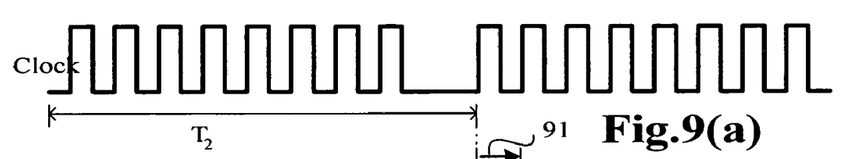
FIG. 9 shows an exemplary shift of the reference timing sequence.
Figure 9B:
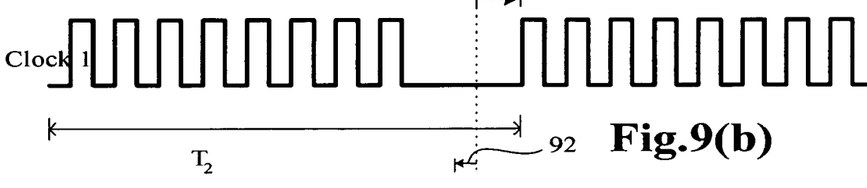
Figure 9C:
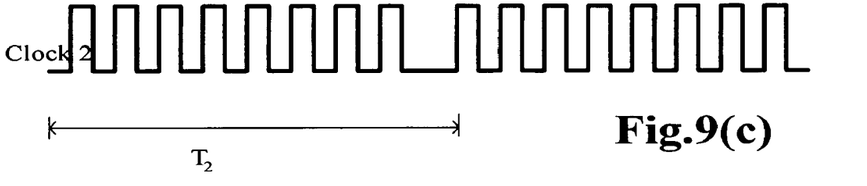

Please refer to FIG. 9(a), (b), (c). Numerals 91 and 92 are examples of shift amount in this embodiment. The $T_2$ of clock 1 signal is shifted by a random value 91 and the $T_2$ of clock 2 signal is shifted by a random value 92.

Figure 10A:
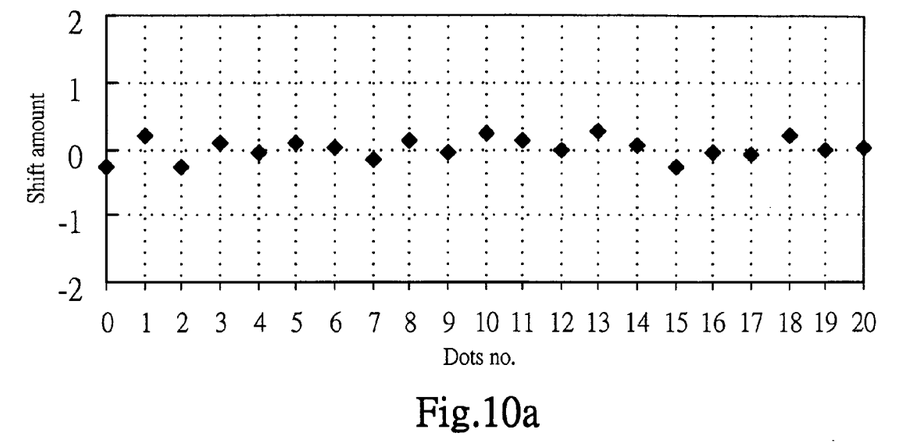
FIG. 10a shows a predetermined random shift amount in one embodiment of the present invention.
Figure 10B:
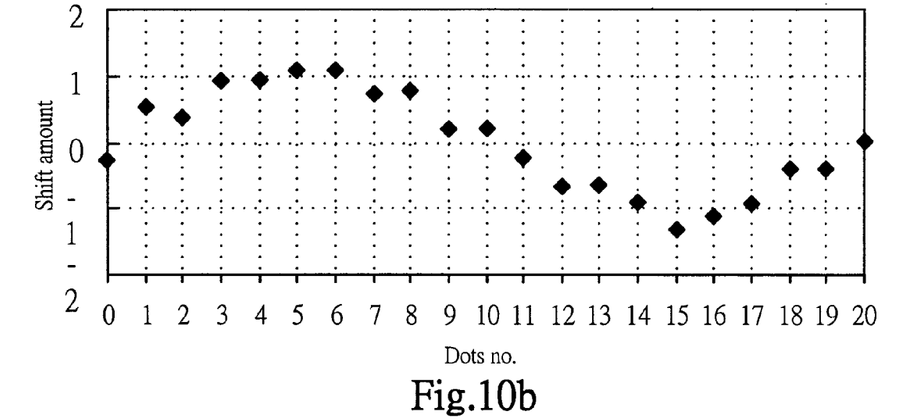
FIG. 10b depicts a shift result induced by adding a predetermined random value sequence.
Figure 10C:
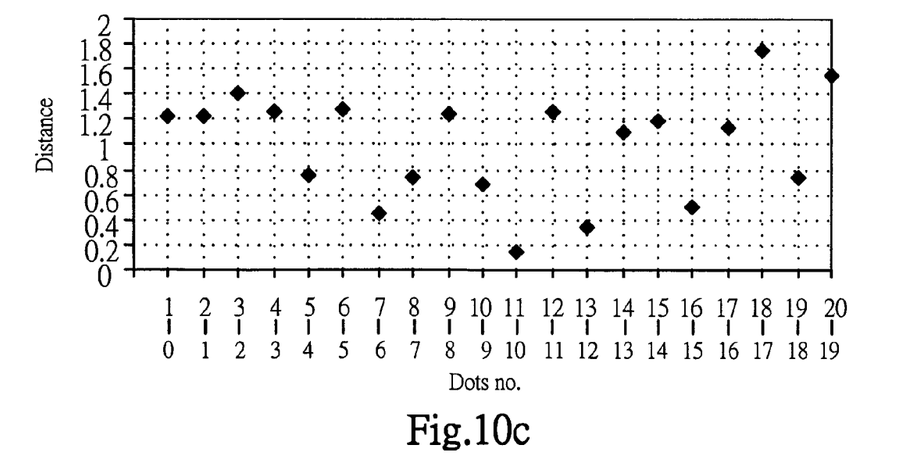
FIG. 10c shows the distance between two adjacent dots.

FIG. 10a shows an example of a random value sequence. The positions of the printed dots are determined by the reference timing sequence shifted by the random value sequence. FIG. 10b depicts the shifted positions of dots. The positions are shifted by adding the shift amounts in FIG. 10a to the original reference timing. FIG. 10c shows the distance between two adjacent dots after operation of the invention. It is clear that the cyclic deviation of dots is scattered. Hence the unevenness of printed image is decreased to obtain an image of higher quality.

Figure 11A:
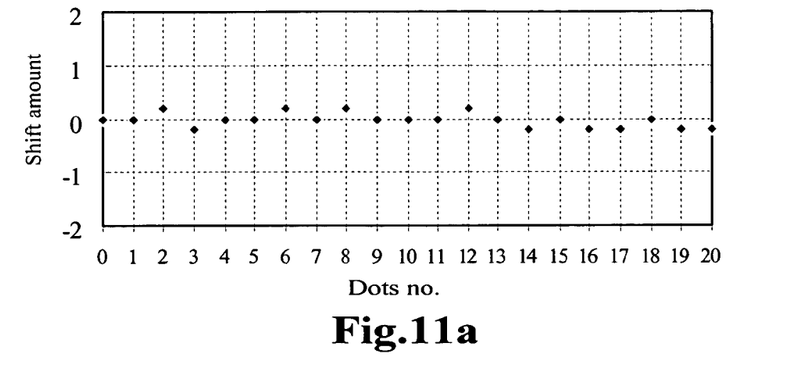
FIG. 11a shows another predetermined random value sequence in an embodiment.
Figure 11B:
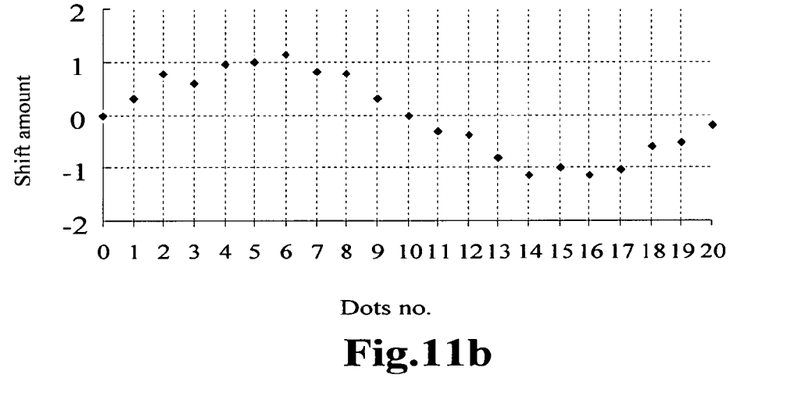
FIG. 11b depicts a shift result induced by adding a predetermined random value sequence.
Figure 11C:
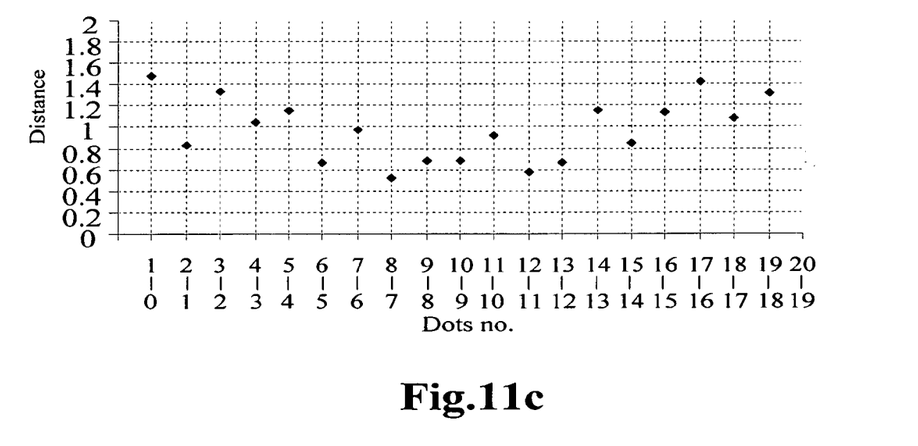
FIG. 11c shows the distance between two adjacent dots.

FIG. 11a shows another example of random value sequence. FIG. 11b shows the result of the operation of the invention. FIG. 11c shows the distance between two adjacent dots after operation of the invention.

Figure 12A:
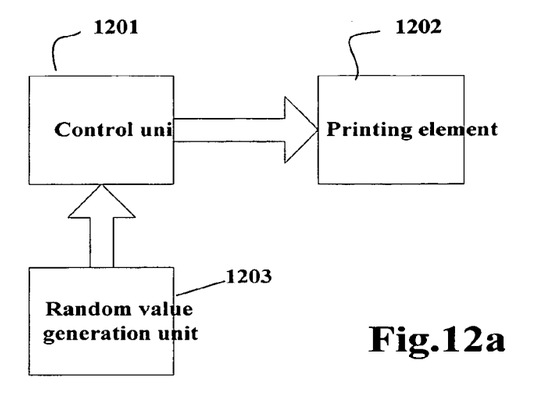
FIG. 12a shows a block diagram for generating a random value sequence in the first embodiment.

Please refer to FIG. 12a. In one embodiment of the present invention, a circuit may be used as a random value generation unit 1203. The random value generation unit 1203 generates the random value sequence. Then the random value sequence is transmitted to a control unit 1201. The control unit 1201 then drives the printing elements 1202 to form dots, in accordance with the present invention.

Figure 12B:
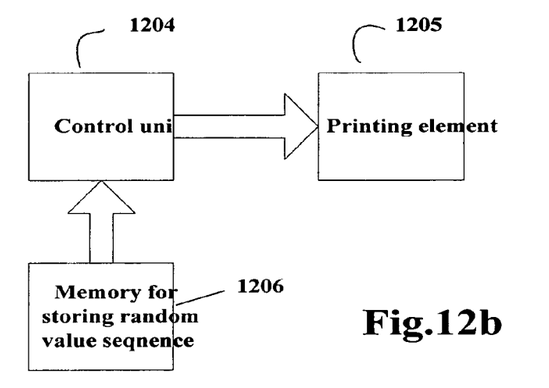
FIG. 12b shows a block diagram for generating a random value sequence in the second embodiment.

Please refer to FIG. 12b. In another embodiment, a random value sequence is stored in a memory unit 1206. The printing elements 1205 are driven by the control unit 1204 according to the random value sequence previously stored in the memory unit 1206.

Figure 12C:
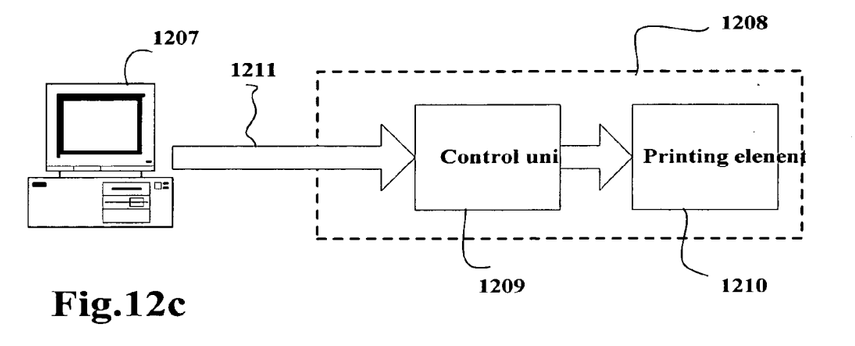
FIG. 12c shows a block diagram for generating a random value sequence in the third embodiment.
Figure 13A:
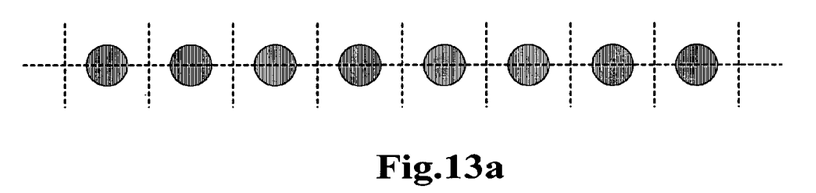
Figure 13B:
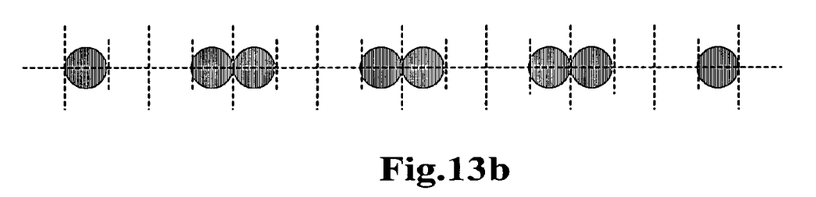
Figure 13C:
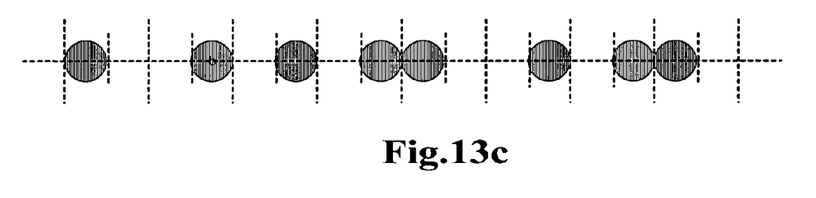
Figure 14:
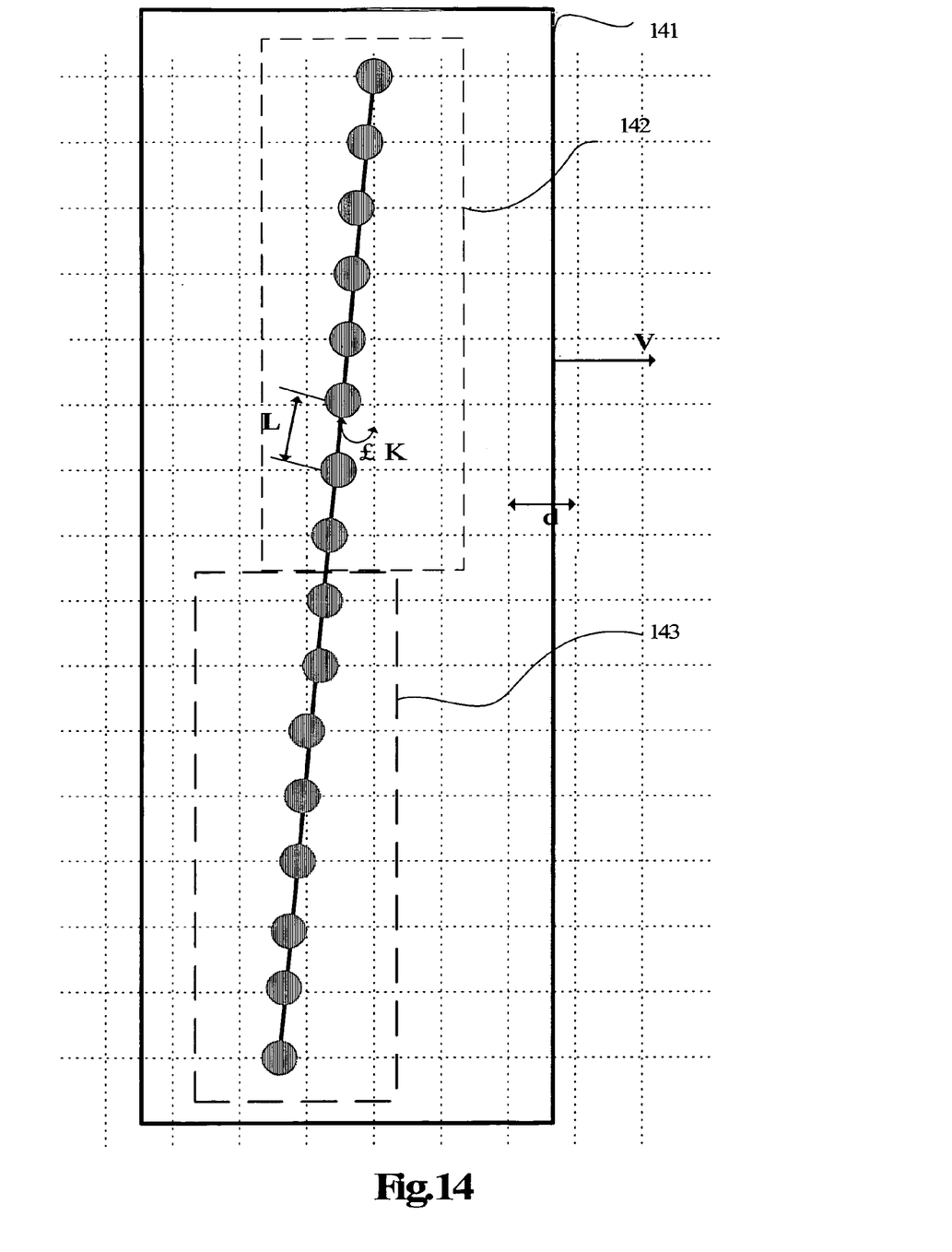

Please refer to FIG. 12c. The random value sequence may also be generated by an external generation unit 1207, such as personal computer. The random value sequence is transmitted to a control unit 1209 via a transmission protocol. Control unit 1209 then drives the printing elements 1210 by the reference timing sequence and the random value sequence.

The above description sets forth various exemplary embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims.

What is claimed is:

1. A printing apparatus comprising:
a print head for scanning over a printing medium in a predetermined direction, said print head comprising a printing element set comprising M printing elements for selectively forming dot images on said printing medium, wherein M is a positive integer;
a timing device for, in response to a reference timing sequence and a random value series, generating N sets of driving timing sequences, said random value series including N random values, each of the N sets of driving timing sequences being obtained by shifting said reference timing sequence with corresponding one of N random values, wherein N is a positive integer; and
a driving device for, in response to said N sets of driving timing sequences, forming said dot images, wherein each set of driving timing sequences sequentially drives the M printing elements to provide random distances in the predetermined direction between centers of consecutive dot images formed by the printing element set of the printing head.

2. The printing apparatus according to claim 1 wherein said timing device respectively adds N random values to said reference timing sequence to generate said N set of driving timing sequences.

3. The printing apparatus according to claim 1 wherein said timing device respectively multiplies N random values to said reference timing sequence to generate said N sets of driving timing sequences.

4. The printing apparatus according to claim 1 further comprising a unit for generating said random value series, said random value series being transmitted to said timing device via a transmission protocol.

5. The printing apparatus according to claim 1 wherein said print head is an ink jet head to perform printing.

6. A print method for forming dot images on a printing medium using a print head to scan over said printing medium in a predetermined direction, said print head comprising a printing element set comprising M printing elements wherein M is a positive integer, said method comprising the steps of:
generating a reference timing sequence;
generating N sets of driving timing sequences by shifting said reference timing sequence with a random value series including N random values, wherein N is a positive integer; and
driving said printing element set in response to said N sets of driving timing sequences to form said dot images, wherein distances between centers of consecutive dot images formed by the printing element set of the printing head are random in the predetermined direction.

7. The print method according to claim 6 wherein said N random values are respectively added to said reference timing sequence for generating said N sets of driving timing sequences.

8. The print method according to claim 6 wherein said N random values are respectively multiplied to said reference timing sequence for generating said N sets of driving timing sequences.

9. The print method according to claim 6 wherein said print head is an ink jet head to perform printing.

10. A printing apparatus comprising:
a print head for scanning over a printing medium in a predetermined direction, the print head comprising at least one printing element;
a timing device for generating a driving timing sequence by shifting a reference timing sequence with a random value; and
a driving device for, in response to said driving timing sequence, driving said printing element to form an image by printing dots on said printing medium;
wherein, with the shifting of said reference timing sequence, a cyclic unevenness of said image is scattered and random distances in the predetermined direction between centers of consecutive dots printed by the at least one printing element of the printing head is provided.

11. The printing apparatus according to claim 10 wherein said timing device generates said random value by referencing to a random value sequence.

12. The printing apparatus according to claim 11 wherein said timing device adds said random value sequence to said reference timing sequence to generate said driving timing sequence.

13. The printing apparatus according to claim 11 wherein said timing device multiplies said random value sequence to said reference timing sequence to generate said driving timing sequence.

14. The printing apparatus according to claim 11 wherein said random value sequence is composed of a set of numbers in random order.

15. The printing apparatus according to claim 11, further comprising a unit for generating said random sequence, said timing device transmitting said random value sequence via a transmission protocol.

16. The printing apparatus according to claim 10 wherein said print head is an ink jet head to perform printing.

17. The print apparatus according to claim 10 wherein said printing elements are divided into multiple groups, said timing device generating a driving timing sequence for one group of printing elements by shifting the reference timing sequence with a random amount.

18. A print method for forming an image on a printing medium using a print head to scan over said printing medium in a predetermined direction, said print head comprising at least one printing element, said method comprising:
generating a reference timing sequence;
generating a driving timing sequence by shifting said reference timing sequence with a random value; and driving said printing element with said driving timing sequence to form said image on said printing medium, wherein distances between centers of consecutive dot images formed by the at least one printing element of the printing head are random in the predetermined direction.

19. The print method according to claim 18 wherein shifting said reference timing sequence with a random value refers to a random value sequence.

20. The print method according to claim 19 wherein said random value sequence is added to said reference timing sequence for generating said driving timing sequence.

21. The print method according to claim 19 wherein said random value sequence is multiplied to said reference timing sequence for generating said driving timing sequence.

22. The print method according to claim 19 wherein said random value sequence is composed of a set of numbers in random order.

23. The print method according to claim 18 wherein said print head is an ink jet head to perform printing.

* * * * *